Jan. 6, 1931. A. McNAB 1,787,637
AIR EXTRACTOR
Filed Dec. 17, 1928
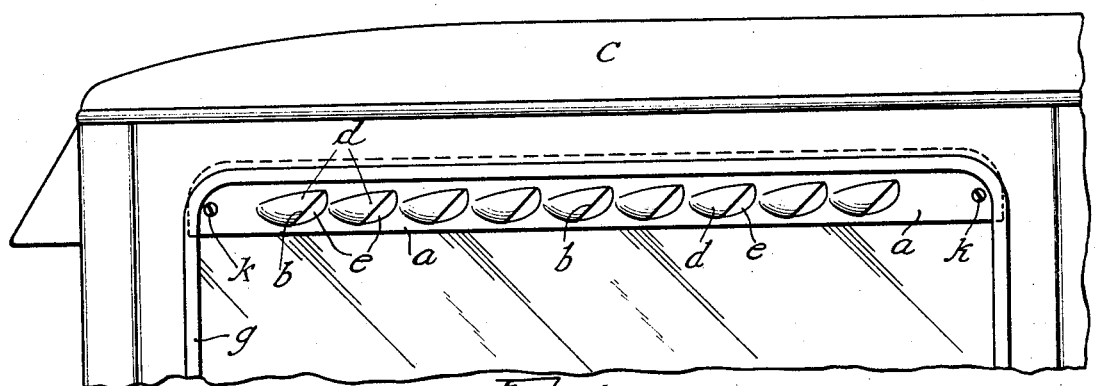
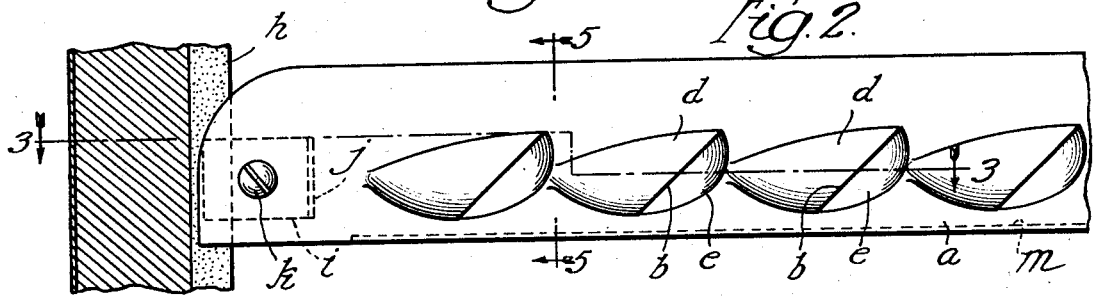
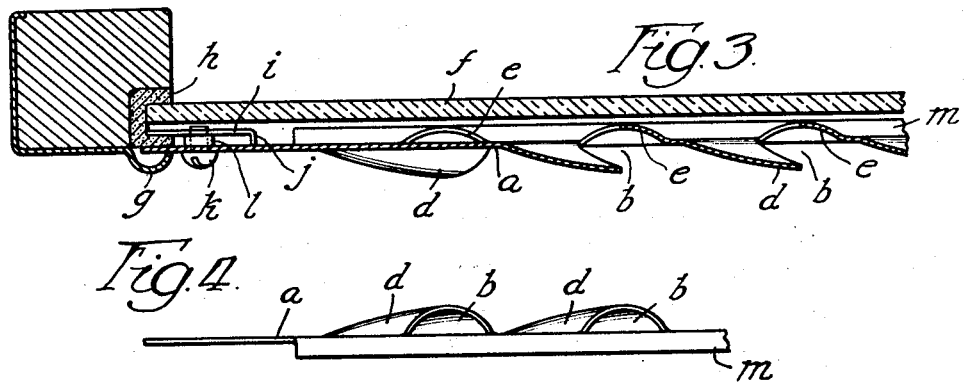
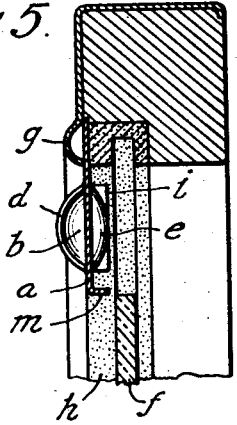
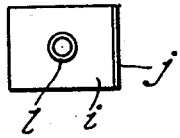
Inventor
Alexander McNab
By Marks Clark
Atty Patented Jan. 6, 1931

1,787,637

UNITED STATES PATENT OFFICE

ALEXANDER McNAB, OF BRIDGEPORT, CONNECTICUT, ASSIGNOR TO McNAB ABSORBO-LIFT, INC., OF NEW YORK, N. Y., A CORPORATION OF NEW YORK

AIR EXTRACTOR

Application filed December 17, 1928. Serial No. 326,673.

This invention relates to the art of air extraction and in particular to the extraction of air from moving bodies such as automobiles, aircraft of all kinds, steamships, and railway cars.

The principal object of the invention is to provide means, acting in co-operation with the air outside of a body and effective through a relative motion of said body and said body and said outside air, to cause an extraction of air from within the body.

Another object is to provide a device which may be removably attached in the window opening of a moving body, such as an automobile, with the least amount of trouble in fixing the same to, or removing it from, said opening.

A further object is to provide a device which is adapted to be removably attached in the window opening of a vehicle and which, when in position, does not interfere with the normal operation of the window.

A still further object is to provide a device which, when fixed in position in a window opening allows full travel of the window, so that the latter may act as a regulating shutter to regulate the amount of air extracted through the device.

A further object is to provide a moving body, such as an automobile, with a device which prevents steaming or fogging of the vision which occurs in such a vehicle when it is desirable to have the windows of the automobile closed.

Further objects of the invention will appear hereinafter and will be specifically pointed out in the appended claims.

The invention is illustrated in the accompanying drawings as positioned to the window opening of an automobile, but it is to be understood that this illustrated embodiment of the invention is given by way of example only and is not, in any way, limitative of the scope of the invention which is defined in the appended claims.

In the accompanying drawings:—

Figure 1 is a partial view of the window frame of an automobile, showing an air extractor according to the present invention positioned therein, Figure 2 is an enlarged view of the left-hand end of the extractor shown in Figure 1, Figure 3 is a section on line 3—3 of Figure 2 in the direction of the arrows associated with said line, Figure 4 is a view of the left-hand end of the extractor shown in Figure 2 looking upwardly at the bottom thereof, Figure 5 is a section on the line 5—5 of Figure 2 in the direction of the arrows associated with that line, Figure 6 is a detached view of a clamping plate.

Referring to the drawings, it will be seen that the air extractor illustrated therein is in the form of a sheet or strip of material ($a$) having therein a series of aperatures ($b$). In the form shown, the apertures ($b$) are arranged in a single row and spaced at equal distances from each other. Each aperture ($b$) is formed by slitting the strip of material ($a$) on a line which is inclined downwardly and forwardly at an angle of less than 90° to the line of relative motion of the extractor and the air external thereto. In the embodiment illustrated in the drawings, the slit made in the strip of material ($a$) is, of course, inclined downwardly and forwardly at an angle of less than 90° to the line of the automobile, the body of which is indicated generally by the reference letter ($c$) (see Figure 1). After the strip ($a$) has been slit in the manner indicated, the material of the strip is deformed on opposite sides of the slit in opposed direction in relation to the plane of the sheet or strip ($a$). On the forward side of the slit, the material of the sheet or strip ($a$) is deformed outwardly to form an elevation ($d$), while to the rear of the slit the material of the sheet or strip ($a$) is deformed inwardly to form a depression ($e$). It is obvious from an examination of Figure 3 that the edges of the elevation ($d$) and depression ($e$) and, therefore, that the aperture ($b$) itself lies in a plane which is substantially perpendicular to the plane of the sheet or strip ($a$), and, therefore, to the plane of motion of the body to which the air extractor is attached. This plane, of course, is also inclined downwardly and forwardly corresponding to the inclination of the slit which was formed in the sheet or strip (*a*) to permit of the deformation of the material of the strip as already explained. The aperature (*b*) may, therefore, be said to open rearwardly and downwardly, so that, as the body to which the air extractor is attached is moved forwardly, it is impossible for rain or air to enter the apertures (*b*). It is also obvious that as the air extractor moves forwardly with the body to which it is attached, the motion of the air past the elevations (*d*) and over the apertures (*b*) causes a suction or entraining action in the apertures (*b*) by which air from the inside of the extractor, i. e., from the interior of the automobile body, in the case of the embodiment of the invention illustrated, is caused to pass out through the apertures (*b*).

The sheet or strip (*a*) is insertable in the window opening of the automobile body (*c*) in a manner to allow full travel of the window (*f*), so that the latter may be used to regulate the effective opening of the apertures (*b*) in the strip (*a*). As clearly shown in Figure 3, the strip (*a*) is inserted between the window frame (*g*) and the felt strip (*h*) in which the window (*f*) moves. After the ends of the strip (*a*) have been inserted in this manner and the strip properly positioned in the upper part of the window, the same is secured in position by means of a clamping plate (*i*) having a flange (*j*) to contact with the strip (*a*) and which is caused to clamp the felt strip (*h*) by means of a screw (*k*) passing through the strip (*a*) into a threaded flange (*l*) on the clamping plate (*i*). The lower edge of the strip (*a*) is provided with an inturned flange (*m*) which approaches to, but does not actually contact with the outer surface of the window (*f*). It will be seen that the strip (*a*) is by this means readily detachable to and removable from the window frame on which it is to be used and, when in position, it does not interfere with the full travel of the window (*f*) which, as already explained, may be used to regulate the effective opening of the apertures (*b*).

The air extractor will, by reason of the movement of the automobile, act to withdraw air from within the automobile body without causing drafts objectionable to passengers in the automobile. Such extraction will occur on the windward side of the automobile and by slightly lowering a window on the other side of the automobile body, fresh air, to replace the air which is extracted, can be admitted through the apertures of the extractor on such other side.

In this way, the air within the automobile body can be caused to circulate and can be continuously renewed without discomfort to persons riding in the car. This circulation and renewal of air will also prevent the steaming and fogging of the vision which is inevitable when the windows of an automobile are closed to avoid drafts. Moreover, since the apertures in the extractor face downwardly and rearwardly, as already explained, it is impossible for rain or snow to pass therethrough, regardless of whether the automobile is moving or at rest.

In addition to the illustrated use in connection with automobiles, the air extractor, in accordance with the present invention, can be used with all kinds of moving bodies and may be applied, for instance, to aircraft of all kinds, steamships, and railway cars. Further it can be used in all cases where there is a relative motion between the extractor and a current of air, so that, if it is desired, the extractor may be placed on a stationary body and a stream of air be caused to pass over the extractor.

I claim as my invention:

1. An air extractor for attachment to a moving vehicle and in the form of a strip having therein a single row of apertures, each of which lies in a plane which is substantially perpendicular to the plane of motion of the vehicle and which is inclined downwardly and forwardly at an angle of less than ninety degrees to the line of motion of said vehicle, said strip being insertable in the window opening of a vehicle between the window frame and the felt strips in which the window moves, and a plate adapted in conjunction with the extractor to compress said felt strip to secure the extractor in said window opening.

2. An air extractor for attachment to a moving vehicle and in the form of a strip having therein a single row of apertures, each of which is formed by slitting the strip on a line which is forwardly and downwardly inclined at an angle of less than ninety degrees to the line of motion of said vehicle and by deforming the material of the strip on opposite sides of the slit in opposed directions in relation to the plane of the strip, said strip being insertable in the window opening of a vehicle between the window frame and the felt strips in which the window moves, and a plate adapted in conjunction with the extractor to compress said felt strip to secure the extractor in said window opening.

3. An air extractor for attachment to a moving vehicle in the form of a strip having therein a single row of apertures, each of which is formed by slitting the strip on a line which is forwardly and downwardly inclined at an angle of less than ninety degrees to the line of motion of said vehicle and by deforming the material of the sheet outwardly on the forward side of the slit and inwardly on the rearward side of the slit, said strip being insertable in the window opening of a vehicle between the window frame and the felt strips in which the window moves, and a plate adapted in conjunction with the extractor to compress said felt strip to secure the extractor in said window opening.

4. An air extractor for attachment to a moving vehicle and in the form of a strip having therein a single row of apertures, each of which is formed by slitting the strip on a line which is forwardly and downwardly inclined at an angle of less than ninety degrees to the line of motion of said vehicle and by deforming the material of the strip on opposite sides of the slit in opposed directions in relation to the plane of the strip, means including a plate for securing the extractor in the window opening of a vehicle between the window frame and the felt strips in which the window moves.

5. An air extractor for attachment to a moving vehicle in the form of a strip having therein a single row of apertures, each of which is formed by slitting the strip on a line which is forwardly and downwardly inclined at an angle of less than ninety degrees to the line of motion of said vehicle and by deforming the material of the sheet outwardly on the forward side of the slit and inwardly on the rearward side of the slit, means including a plate for securing the extractor in the window opening of a vehicle between the window frame and the felt strips in which the window moves.

In testimony whereof I affix my signature hereto.

ALEXANDER McNAB.